(12) United States Patent
Veldhoen

(10) Patent No.: US 8,402,618 B2
(45) Date of Patent: Mar. 26, 2013

(54) FASTENING DEVICE

(75) Inventor: George Gustaaf Veldhoen, Oud-Alblas (NL)

(73) Assignee: Partnership Twello B.V., Rotterdam (NL)

( * ) Notice: Subject to any disclaimer, the term of this patent is extended or adjusted under 35 U.S.C. 154(b) by 207 days.

(21) Appl. No.: 12/993,896

(22) PCT Filed: May 22, 2009

(86) PCT No.: PCT/NL2009/050284
§ 371 (c)(1),
(2), (4) Date: Nov. 22, 2010

(87) PCT Pub. No.: WO2009/142500
PCT Pub. Date: Nov. 26, 2009

(65) Prior Publication Data
US 2011/0094071 A1    Apr. 28, 2011

(30) Foreign Application Priority Data

May 23, 2008  (NL) ........................ 1035465
Nov. 18, 2008  (NL) ........................ 2002222

(51) Int. Cl.
*A44B 17/00*    (2006.01)
(52) U.S. Cl. .......................... 24/684; 24/694; 24/71 TD
(58) Field of Classification Search ............. 24/684, 24/682.1, 683, 71 R–71 SD, 662, 671–676, 24/694
See application file for complete search history.

(56) References Cited

U.S. PATENT DOCUMENTS

| | | | | |
|---|---|---|---|---|
| 448,893 | A | * | 3/1891 | Thompson .................. 24/71 SK |
| 957,651 | A | * | 5/1910 | Brown ......................... 24/71 SK |
| 2,328,016 | A | | 8/1943 | Huelster |
| 2,441,573 | A | | 5/1948 | Huelster |
| 2,606,353 | A | | 8/1952 | Huelster |
| 3,818,550 | A | | 6/1974 | Cresswell |
| 3,918,140 | A | * | 11/1975 | Konstant ......................... 29/271 |
| 5,212,860 | A | * | 5/1993 | Lakey ............................. 29/270 |
| 8,156,668 | B2 | * | 4/2012 | Garrett et al. .............. 38/102.91 |

FOREIGN PATENT DOCUMENTS

| | | |
|---|---|---|
| DE | 324 436 C | 8/1920 |
| DE | 32 48 611 A1 | 7/1984 |
| DE | 199 62 001 A1 | 8/2000 |
| FR | 5 639 E | 6/1906 |
| GB | 182 800 A | 10/1923 |
| WO | 2005/015032 A1 | 2/2005 |

OTHER PUBLICATIONS

International Search Report, dated Nov. 3, 2009, from corresponding PCT application.

* cited by examiner

*Primary Examiner* — James Brittain
(74) *Attorney, Agent, or Firm* — Young & Thompson

(57) ABSTRACT

A fastening device of locking press button type includes a first element (1) which in use is present at a substrate and a second element (9) which, to fasten an object (10) to the substrate, can be releasably fastened to the first element by way of a to a snapping part (2) of the first element snapping snapping part (11) of it and wherein the elements (1, 9) remote from their snapping part (2, 11 respectively) have a hooking part (3, 8 respectively) such that the elements (1, 9) first have to be mutually engaged making a mutual angle by the hooking parts (3, 8) and then are pivoted onto each other to subsequently be fixed snapped to each other.

10 Claims, 7 Drawing Sheets

Figure 2:
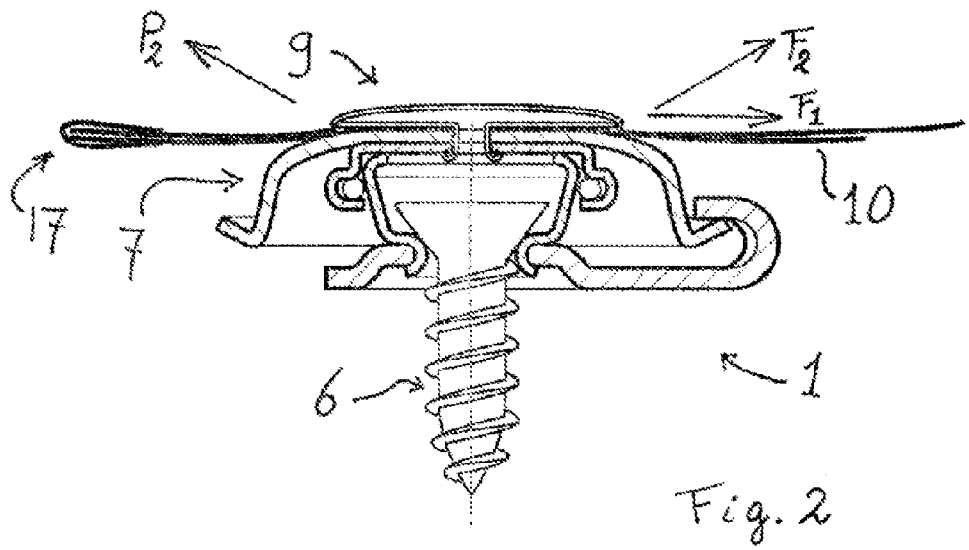

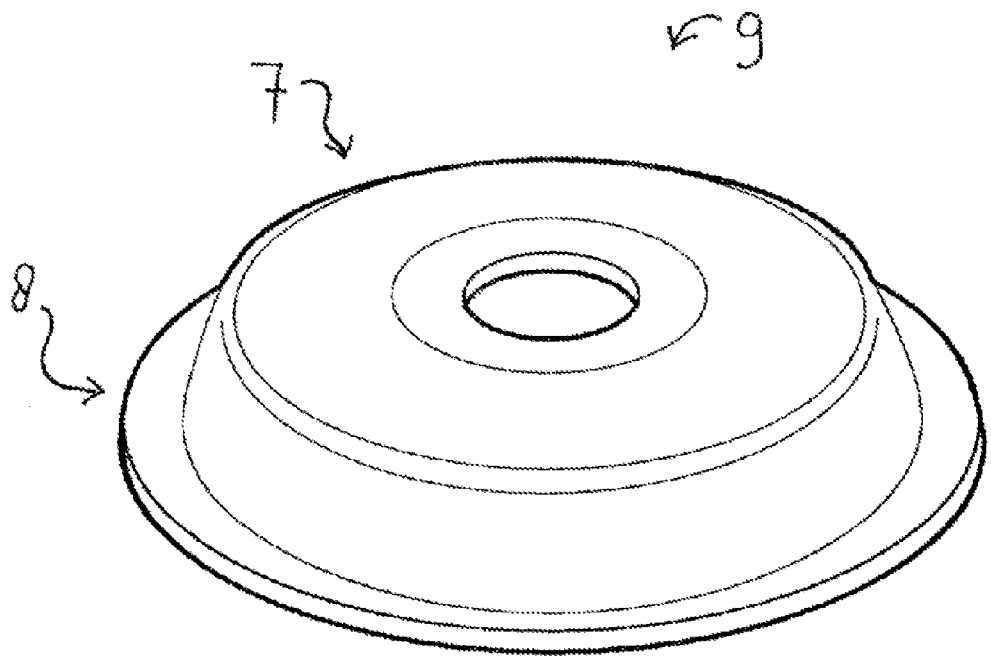
Fig. 1
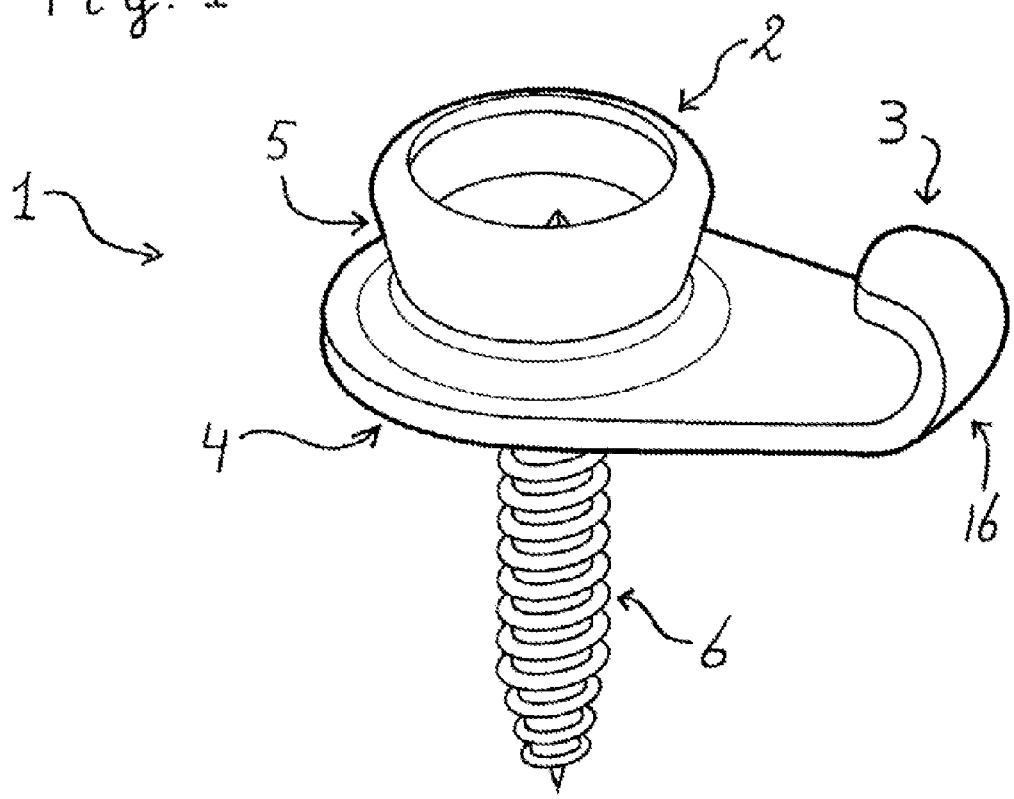

FASTENING DEVICE

The invention relates to a fastening device (hereafter "device") to firm and easily releasable fasten an object to a substrate, such as a foil, comprising a first element which in the state of use is mounted to the substrate and a second element, wherein those two elements are designed such that they can be releasably mounted to each other, particularly without the use of a tool. The object to be fastened is fastened to the substrate by mutually mounting of the first and second element, for which the second element can be mounted to said object in an earlier stage, or e.g. the object will be caught or clamped between the mutually fastened first and second elements. The first and/or second element can have button or knot shaped parts for mutual fastening.

A prior art device of this type is e.g. used to under tension fasten a sheeting/covering sheet to a ship deck or to a car or caravan. In that case the First element is provided with a projection onto which the second element can releasably be fastened. The projections, which inevitably are permanently present at e.g. the ship deck, cause inconvenience and injuries.

Further related devices are known from WO2005015032 (Partnership Twello B.V.), DE-A-3248611, DE-A1-19962001 and U.S. Pat. No. 3,818,550. A push button with hooking edge for a shoe fastener is e.g. disclosed in DE324436 (Wilhelm Brase, 1920), GB182800 (Isodore Menville, 1923) and FR5639 (Achille F. Raymond, 1906). Technical background is provided by U.S. Pat. No. 2,606,353, U.S. Pat. No. 2,441,573 and U.S. Pat. No. 2,328,016.

The object of the invention is versatile and relates to a device with one or more of the following: will not easily release unintentionally, preferably merely if a part of it fails; can be fastened and/or released with a single hand; can be fastened and/or released in a single smooth movement; fastening takes place by pushing the First and second element onto each other; operates by making use of resilient into each other engaging or in/at each other snapping parts which are e.g. exposed to the fastening forces; can be made from a minimum number of parts; can be made such that the second element is mounted to the object permanently/without risk for loss; by mutually fastening of the first and second element stress can be created within the object; is insensitive for contamination; offers the advantages of a standard press-button or snap button; has de tendency to during use orient one or both elements in the optimum position of use; offers a mechanical locking e.g. such that the during normal use in the object created increase of stress does not cause mutual release of the elements; offers a mechanical locking which does not or hardly hinders during mutually releasing the elements and/or allows that by manually pulling in the right direction at the object the elements are mutually released; is designed such that in many orientations of the first and/or second element these can be mutually hooked and/or fastened; offers a levering action and/or displacement during mutually fastening of the two elements.

For that the invention is characterised by the accompanying independent claim(s). The dependent claims relate to preferred further developments.

Preferably care is taken such that both elements have a hooking part which can be brought into hooking engagement while the elements mutually make an angle and subsequently allow that, while the hooking engagement is maintained, the elements are pivoted towards each other to be mutually fastened wherein by the pivoting movement a displacement is created which can e.g. be used to stress the object. For that preferably the one element has a hooking part all around while the other element only has a local hooking part. The hooking part of the First and/or second element preferably keeps a substantially fixed distance to a point (e.g. central point), such that the hooking part follows e.g. a circle shape of part of it.

Preferably the hooking part of the one element is outward and of the other element inward directed, e.g. curved.

One or more of the following features are preferred: the hooking part at the one and/or other element is present at the side where the object pulls at the element; the displacement and/or the desired stress in the object is substantially completely created by towards each other pivoting of the elements while they are mutually hooked; the hooking into each other provides mutually registering of the to each other to be fastened/snapped elements; the hooking part at the one and/or other element has a pressed through/bent part to e.g. make the contact surface between the mutually hooking parts smaller and/or keep parts (which e.g. are opposite) of the mutually hooking parts at mutual distance and/or already provide a reliable hooking action if the elements mutually make an angle of 90 degrees; the free end of the hooking part of the one element keeps a slightly larger distance to a point (e.g. central point) than a therewith cooperating limiting edge (e.g. upright edge of the hood/lever disc) at the other element to e.g. in the mutually fastened situation of the elements provide a mounting play; the elements can not be mutually fastened if the hooking parts do not hookingly cooperate mutually.

To easily mutually fasten and release the elements while ensuring of proper locking against unintentional release one or more of the following is preferred: the hooking part of the one and/or other element narrows, preferably in the direction from outward to inward of the element, wherein preferably the hooking part is sideways limited by a substantially the radial following line; the hooking part is provided by a circle arc part covering an angle of 20 or 15 or 10 degrees at the most.

Figure 3:
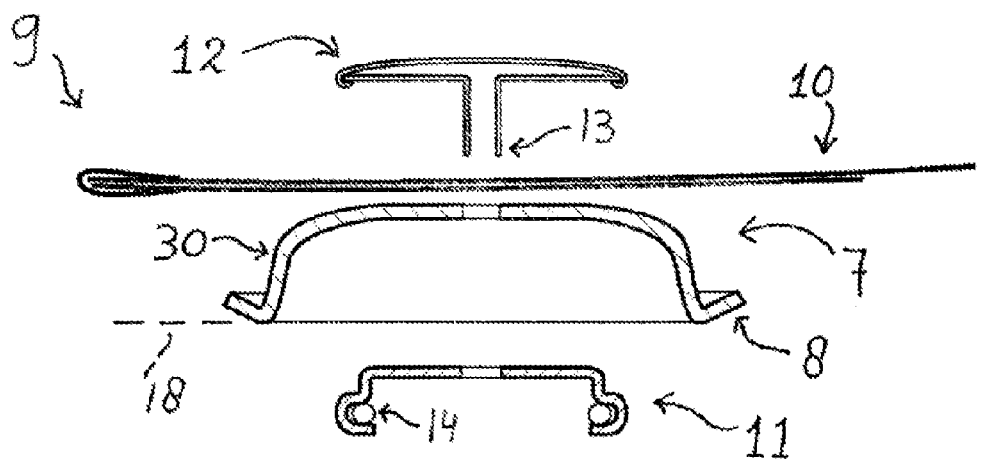
Figure 3:
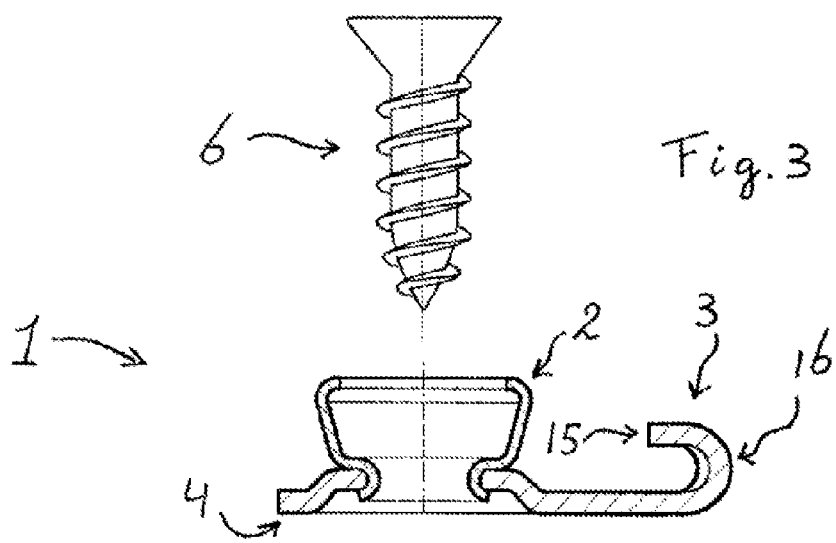
Figure 4:
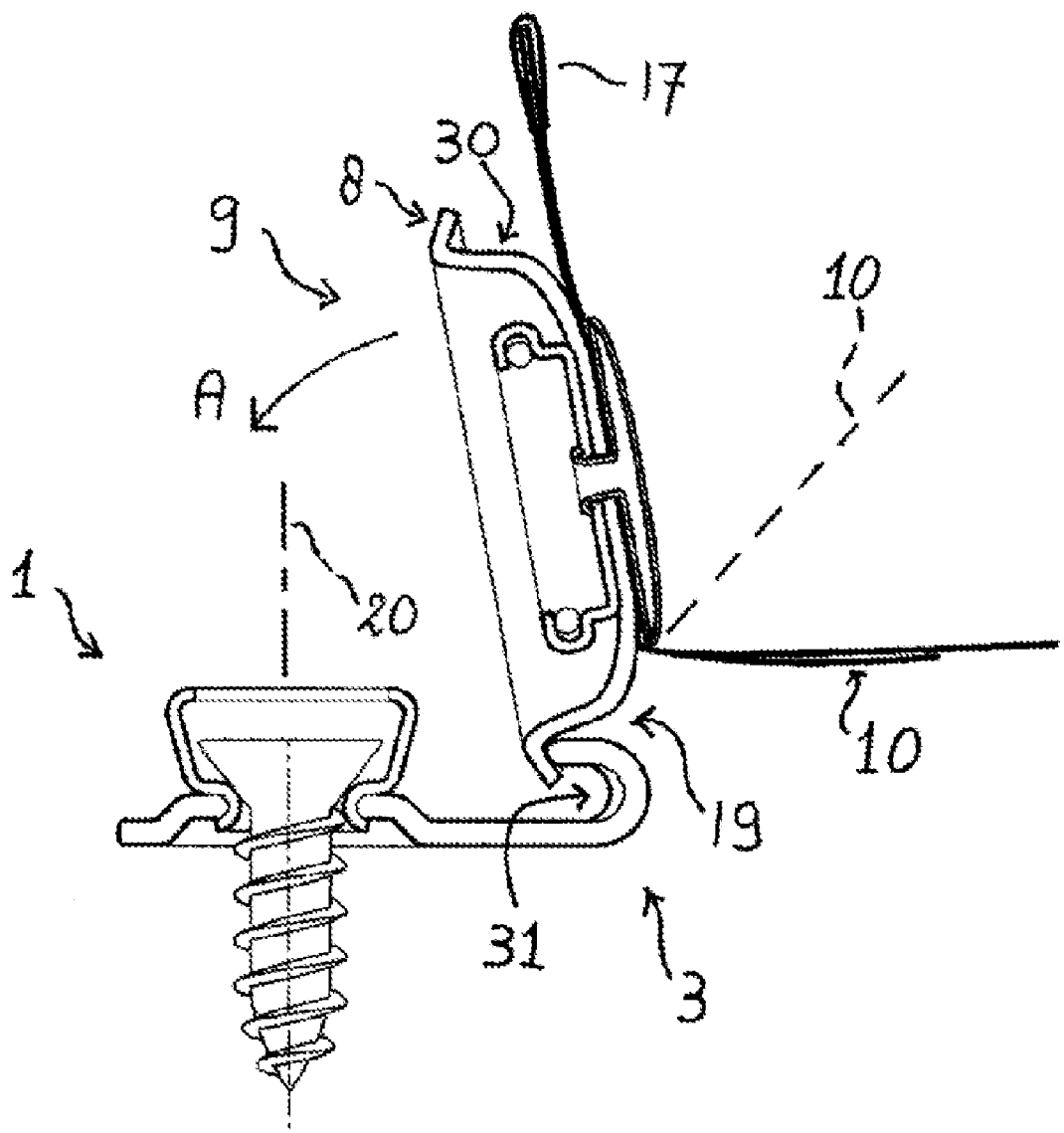
Figure 5:
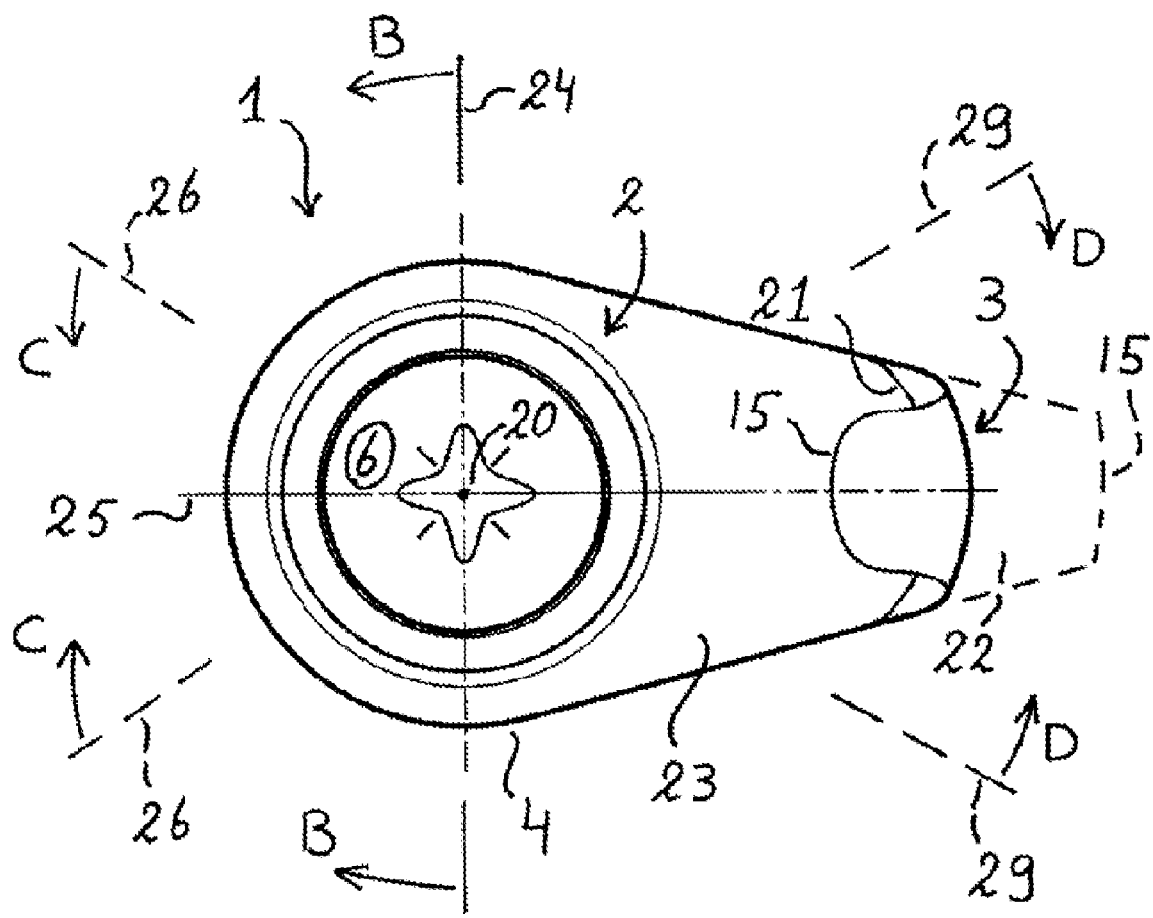
Figure 6:
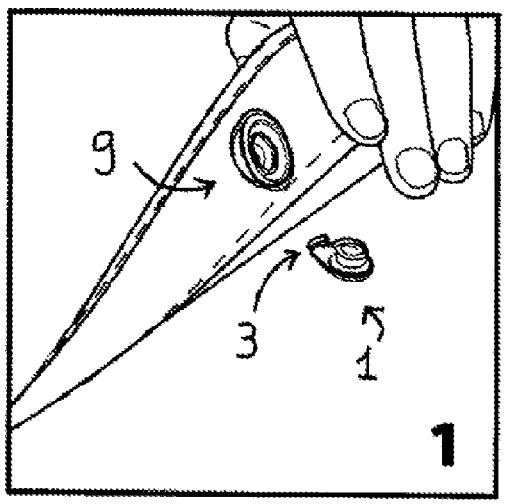
Figure 6:
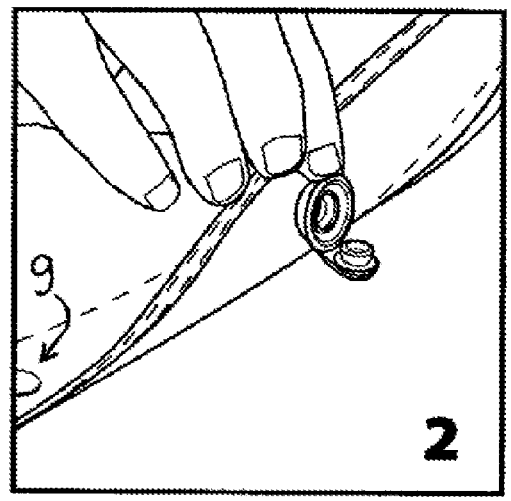
Figure 6:
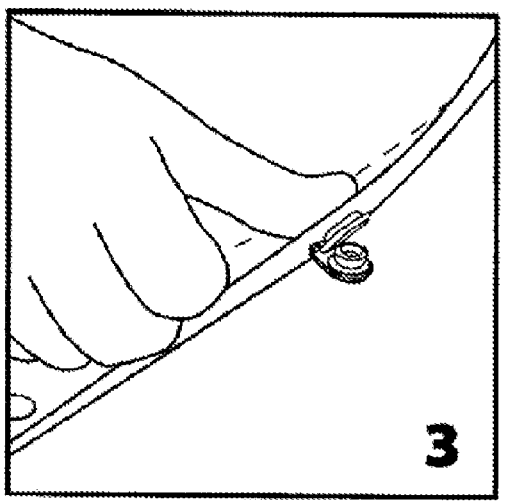
Figure 6:
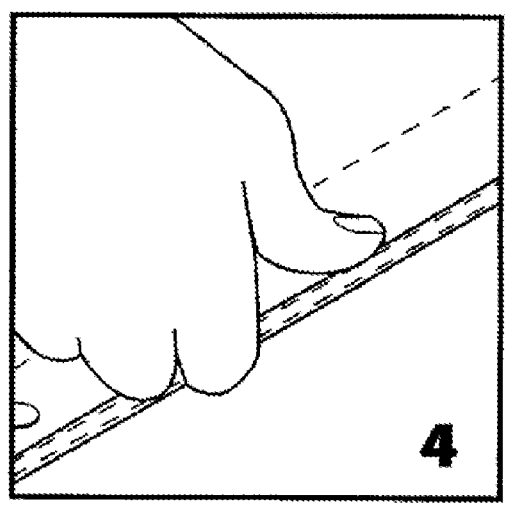
Figure 6:
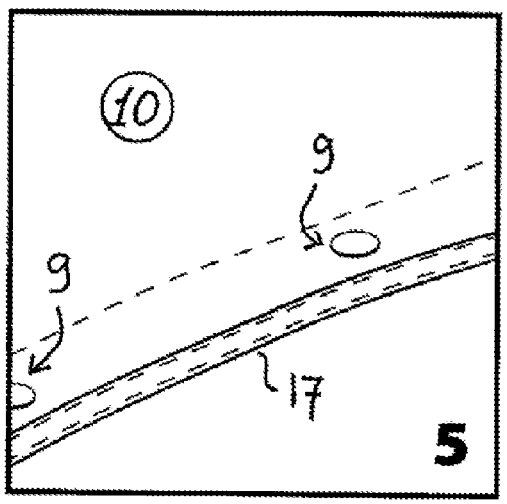
Figure 7:
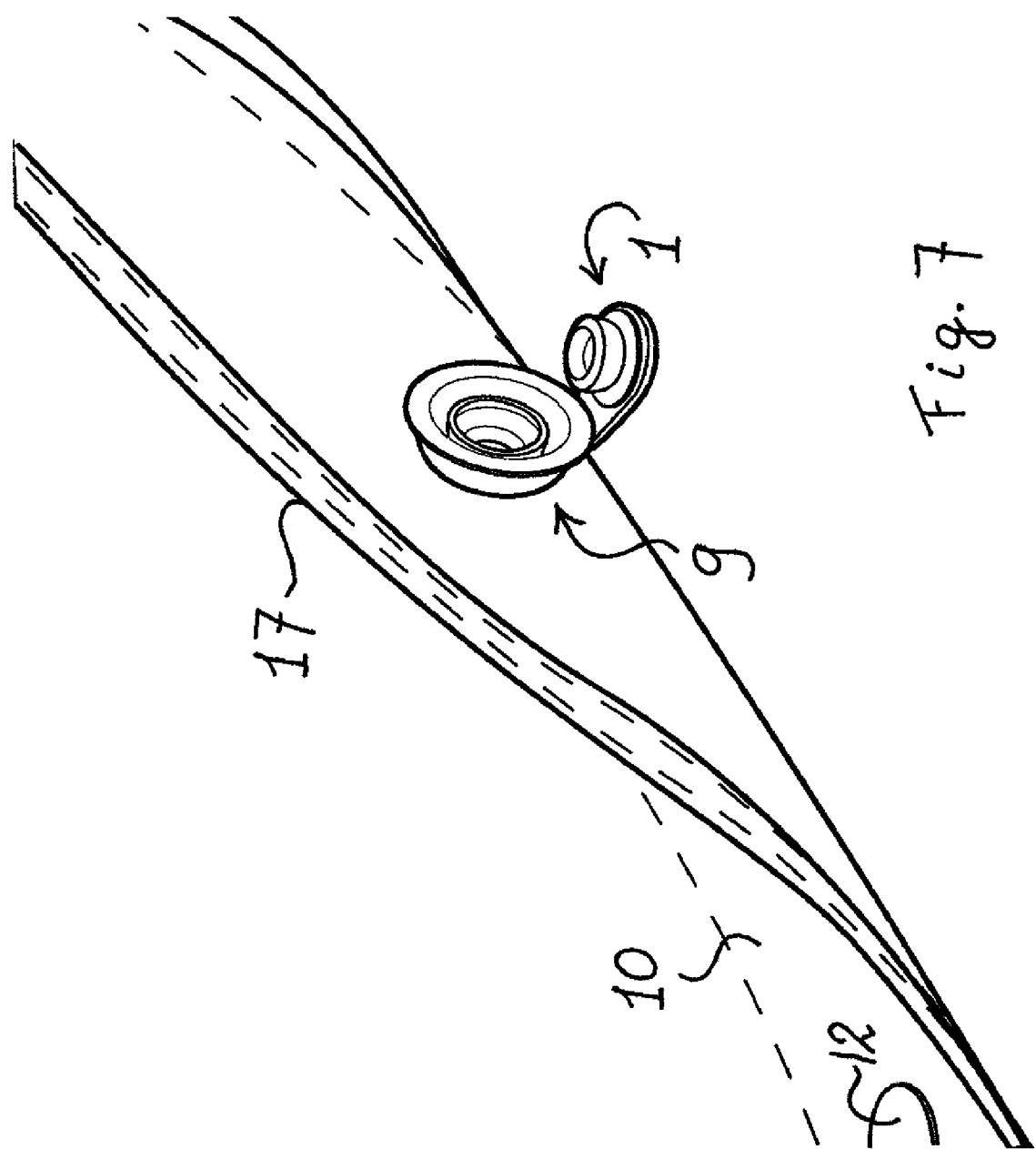
Figure 8:
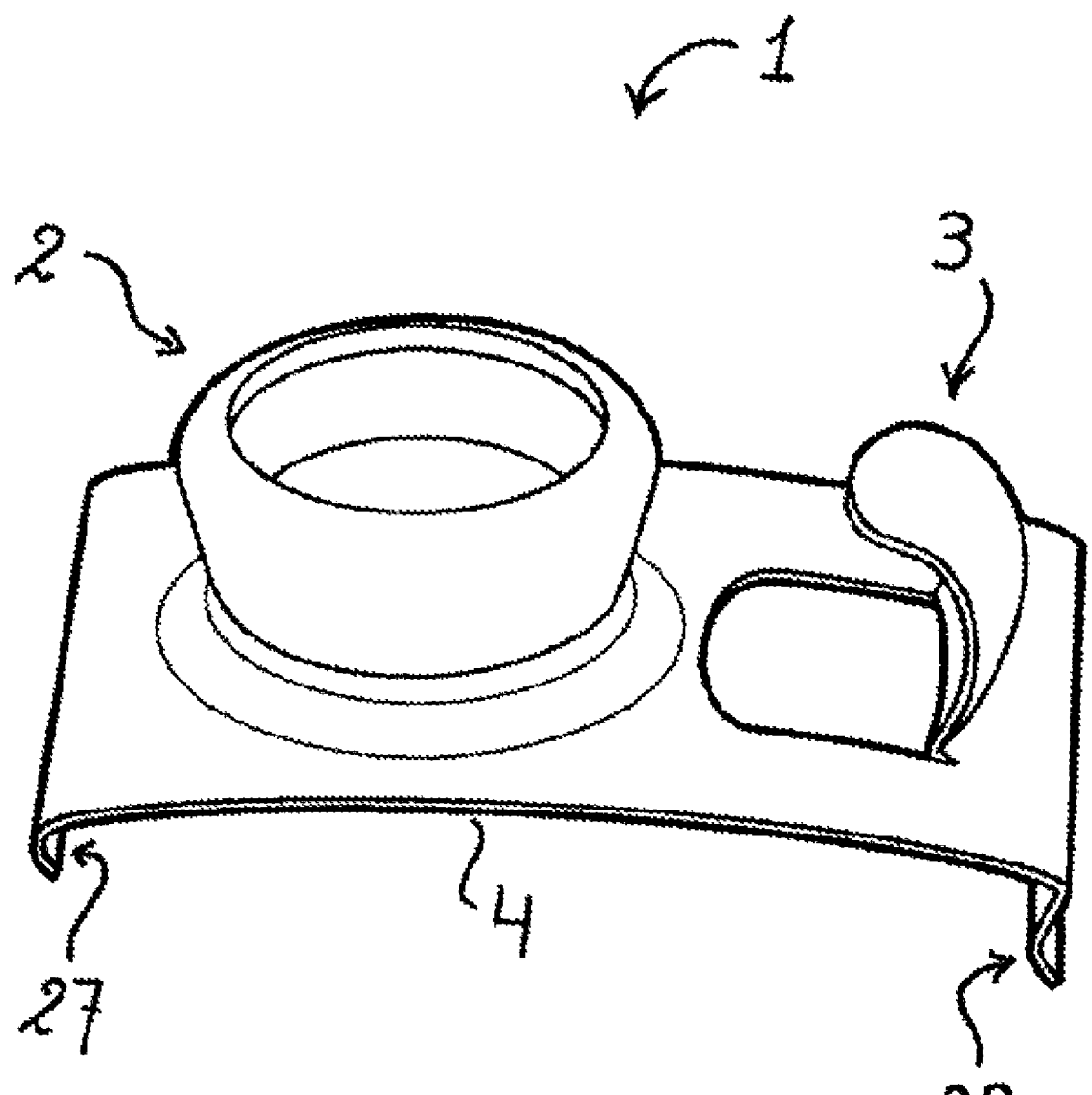

The invention is further illustrated by way of presently the most preferred, non-limiting embodiments, referring to the accompanying drawing, showing in:

FIG. 1 the two elements in perspective obliquely from above;

FIG. 2 the two elements in sectional side view, mutually fastened to stress a sheet;

FIG. 3 the view of FIG. 2 in exploded position;

FIG. 4 a view according to FIG. 2 with the two elements making an angle of approximately 90 degrees and mutually hooked;

FIG. 5 one of the elements in top view;

FIG. 6 in perspective the different subsequent stages during fastening of a sheet with the system according to the invention;

FIG. 7 an enlargement of step 2 of FIG. 6;

FIG. 8 in perspective an alternative for the element of FIG. 5.

The same reference numbers are applied to refer the same parts.

The device of FIG. 1 comprises a First element 1 which can be mounted onto a substrate, e.g. glued, screwed, nailed or riveted. The substrate is preferably rigid, e.g. a ship deck or window frame. The central knot shaped part 2 has a radial symmetry in top view and is designed as the male part of a typical snap button. At a radial distance of the knot shaped part the element 1 has a hooking part 3 with a hooking edge which is oriented inward of the element 1. The hooking part 3 is part of a shaped lip 16 such that a in side view U of V shaped part is provided. The hooking part 3 and the knot shaped part 2 are mutually permanently fixated.

The knot shaped part 2 has a from the ground plate 4 in upward direction widening outer wall 5 such as typical with a snapping closing snap button (undercut shape). A mechanical mounting means, in this embodiment a screw 6 projects coaxially/concentrically through the knot shaped part 2 and with that the first element 1 can be mounted onto the substrate.

The second element 9 of the device of FIG. 1 has also a radial symmetry in top view and has the female part 11 (not visible in FIG. 1) of a typical snap button. Of the second element 9 in FIG. 1 merely the hat shaped part 7 is shown with at its lower side the hooking part 8 to cooperate with the hooking part 3 in a hooking manner. Within the hat shaped part 7 comes coaxially/concentrically the female part 11 of a typical snap button and at its top comes a cover 12.

FIG. 2 shows the elements 1 and 9 releasably mutually snapped wherein at the second element 9 a sheet (sheet, leather or foil product) is permanently fixated (with 17 the free edge seam of the sheet 10 is indicated). FIG. 3 shows the parts of FIG. 2 in exploded view. The element 9 is mounted to the sheet 10 by penetrating the steel 13 of the cover 12 through the sheet and placing the hat 7 and female snapping part 11 onto said steel 13 and after that deform the free end of the steel 13 such that it permanently hooks to the snapping part 11 and hat 7 and sheet 10 are caught and clamped between cover 12 and snapping part 11, a mounting which is typical with a snap button.

The in FIGS. 2 and 3 illustrated parts are all of metal, such as steel or messing, however one or more of them could be made of non-metal, such as polymer material. Metal, such as stainless steel or aluminium, is preferred due to easy deformability, easy mass production and sustainability.

Snapping part 11 has an almost closed ring of resilient material, such as spring steel which in FIG. 2 engages the upright wall of snapping part 2 and from that situation can only be regulatory removed by being forced into a larger diameter due to the upward widening shape of the snapping part 2.

The hooking part 8 extends from its base obliquely upwards in the direction of its free end, such that if the elements 1 and 9 are mutually mounted (FIG. 2) the contact surface there between is minimal and keeps a distance to the free end 15 of the shaped lip 16. An alternative trajectory of the hooking part 8 is illustrated by dashed line 18: from its base flat outward.

In FIG. 2 the arrow F1 indicates the extreme direction along which the sheet 10 can extend from the element 9 without having the risk that element 9 automatically snaps loose from element 1 (without causing permanent deformation or damage to element 1 and/or 9) when stress prevails in sheet 10 at the side of element 9 opposite the seam 17, if the hooking parts 3 and 8 are absent (thus when one can speak of a typical snap button). Arrow F2 indicates for the same considerations a direction along which the sheet 10 can extend from element 9 without the risk that element 9 automatically snaps loose from element 1, if the hooking parts 3 and 8 are present and as FIG. 2 shows co operate. Arrow F2 could even make an angle of 90 degrees with arrow F1. Particularly if the sheet 10 extends according to arrow F2, the cooperation between hooking parts 3 and 8 contributes to keeping the elements 1 and 9 snapped together. If to the contrary the sheet 10 is at the to the edge seam facing side of the element 9 according to the direction of arrow P2 (which extends under an angle obliquely upward as arrow F2) stressed, element 9 will already snap loose at a substantial lower stress in the sheet 10 (in the way as with a typical snap button) from element 1 due to absence of hooking part 3 at that side.

FIG. 4 shows the mutual distance of the elements 1, 9 at the start of temporary mounting and simultaneously displacing/tensioning of the sheet 10 to the substrate to which the element 1 is permanently mounted. The elements 1 and 9 make a mutual angle of almost 90 degrees and these elements are only in mutual engagement through the hooking edges. The sheet 10 has a slight tension at the side of the element 9 facing away from the edge seam 17. By the upward extension of the hooking part 8 from its base already in this position the hooking parts 3 and 8 engage stable into each other. By pivoting from the in FIG. 4 illustrated position the element 9 in the direction of arrow A around the by the into each other engaging hooking parts 3 and 8 determined pivot point 19 the snapping parts 2 and 11 can be snapped fixed to each other. During said pivoting the connecting point between element 9 and sheet 10 displaces into the direction of the central axis 20 of element 1, such that the tension in sheet 10 increases in the desired manner.

By designing the hooking part 3 as shown in FIG. 5 an optimised effect of the invention results. At its to the element 1 connecting base 21 provides the part 3 a circle arc part making an angle between 10 and 20 degrees having as centre point 20 the normal to the paper of the drawing extending central axis of the snapping part 2. From the base 21 the part 3 extends First upward and then inwards to end in a free hooking edge 15. At the hooking edge 15 the part 3 is smallest and at the base 21 the part 3 is widest. There between the width can change continuously or stepwise. E.g. the part 3 is obtained by bending the dashed part 22 around line 21. Part 22 then is the extension of the to the base plate 4 connecting lip 23, wherein the side edges of the continuation 22 are a continuation of the converging straight side edges of the lip 23 while the edge 15 a circle arc part is with centre point 20 and with a length between 5 and 10 degrees shorter than line 21. Thus without permanent deformation or damage the element can be released from element 1 by pulling at the edge 17 of the sheet such that a obliquely upward directed force component is created which in top view is present in the release area (see arrows B) to the left of line 24 through the centre point 20 and perpendicular to the 0 degree line 25 through the centre point 20 and the hooking part 3. If line 15 was as long as line 21, the release area to the left of line 24 would be made substantially smaller and would be located between lines 26 (see arrows C), causing diminishing of the comfort of use.

FIG. 6 shows in step 1 how with a hand the sheet 10 with at it element 9 is brought to the to the substrate mounted element 1. The hooking part 3 is merely present at the side of the snapping part 2 where the desired tension must be created at maintained in the sheet 10 (the side facing away from the sheet edge 17). In step 2 the elements 1 and 9 are just hooked into each other (according to FIG. 4) and another, earlier to a different element 1 snapped element 9 at the sheet 10 is visible. In step 3 the element 9 is pivoted around point 19 (see FIG. 4) by which the tension in sheet 10 rises. In step 4 pivoting is completed and the snapping parts 2, 11 are pressed into each other and step 5 shows the end situation. After that sheet 10 can be released again by grasping edge 17 and pull it up. Elements 9 are released one after the other, starting closest to the location where the edge 17 is pulled at, such that sheet 10 so to speak is zipped loose from the elements 1.

The element 1 of FIG. 8 can be fastened to the substrate by snapping, temporary or permanent, for which at the lower side of the base plate 4 there are a hooking edge 27 and at a distance from it a resilient hooking edge 28. The hooking part 3 is now a from the base plate cut part with preferably substantially the same shape and dimension as disclosed with reference to FIG. 5.

Thus the element 9 can in each turned position of the hat 7 be snapped to element 1 wherein the hooking parts 3 and 8 mutually engage and provide for permanent locking against releasing forces that, viewed from above, are active in a broader or narrower locking area at the to the hooking edge 3 facing side of the snapping part 2 (between lines 29 according to arrows D in FIG. 5). This locking area covers e.g. an area between 20 and 60 degrees or between 30 and 50 degrees symmetrically relative to line 25).

Thus if elements 1, 9 are mutually fastened the hooking parts 3, 8 can be substantially unlimited turned around line 20. The hooking part 8 at the second element merges with an upright wall 30 at its side facing away from its free edge. If elements 1, 9 are mutually fastened the upright wall 30 of the hat 7 extends to above the hooking part 3 at the First element 1 and the free end of the hooking part 3 is located opposite upright wall 30 of the hat 7, possibly leaving there between a narrow gap of 0, 1, 2 or 3 millimeter at the most en the free edge of the hooking part 8 keeps a distance to the upright wall 31 of the hooking part 3 of 1, 2 of 3 millimeter at the most.

Preferably the one snapping part (2) has a part which fits tightly concentrically/coaxially in a part of the other snapping part (11).

It will be appreciated that also equivalent parts belong to the invention, such as another type snapping part 2 or 11.

Also other embodiments belong to the invention, e.g. based on one or more separate measurements of the in here disclosed embodiment, possibly combined with one or more separate measurements of one or more other in here disclosed embodiments. Each in the drawing disclosed part referred to by a reference number or the functional equivalent of the genus of it can independently or in combination with one or more other such parts (or functional equivalents or genus of it) be applied in another combination such that another to the invention belonging embodiment is obtained.

The lower side of base 4 could be provided with additional friction, e.g. by providing a friction coating, to additionally avoid pivoting of base 4 around axis 20.

The invention claimed is:

1. Fastening device, comprising
a first element configured to be fixed to a substrate; and
a second element which, to fasten an object to the substrate, can be releasably fastened to the first element by way of a snapping part of said first element and a snapping part of said second element,
and wherein said first and second elements, remote from their respective snapping parts, each have a hooking part such that, in order to be mutually snap-fixed to each other, said first and second elements at first have to be mutually engaged under a mutual angle by said respective hooking parts and then have to be pivoted onto each other; wherein:
the hooking part of said first element comprises a base and a free edge, and is limited to a single location of said first element, and from its base to its free edge decreases in width;
the hooking part of said second element comprises a base and a free edge and extends completely around said second element;
the hooking part of said second element is part of a hat-shaped part of said second element;
the hooking part of said second element extends obliquely upward to its free edge;
the hooking part of said second element merges with an upright wall of said second element at its side facing away from its free edge; such that if said first and second elements are mutually fastened:
said respective hooking parts can be mutually, limitlessly turned in the plane of the fastener without said first and second elements becoming disengaged; and
said upright wall of said second element extends to above the hooking part of said first element and the free edge of the hooking part of said first element faces said upright wall of said second element with a small gap in between said free edge and said upright wall.

2. Device according to claim 1, wherein at least one of said hooking parts (3, 8) is designed to:
minimize a mutual contact surface between said hooking parts; and/or
mutually hook in an ultimate mutual pivoted position of said first and second elements.

3. Device according to claim 1, wherein said hooking part of said first element has a U or V shape, between the legs of which said hooking part of said second element is configured to be housed.

4. Device according to claim 3, wherein each of said hooking parts, when viewed from above, has an outermost edge that forms an arc of a circle, such that when said first and second elements are fixed to each other the circles that contain said outermost edges of said hooking parts are substantially concentric.

5. Device according to claim 4, wherein if said first and second elements are mutually fastened, at least one of the following features is present:
said hooking part of said first element is configured to provide a retaining action in the directions upward, downward and away from said snapping part of said first element and no retaining action in the direction towards said snapping part of said first element;
said snapping part of said first element and said snapping part of said second element are substantially circular when viewed from above; and said circles that contain said outermost edges of said hooking parts and said snapping parts of said first and second elements are concentric;
said snapping part of said second element comprises a resilient part and/or the said snapping part of said first element comprises a narrowing part;
said snapping part of said first element has a part that tightly fits concentrically into a part of said snapping part of said second element;
said small gap in between said free edge of said first hooking part and said upright wall of said second element is in the range of 1 mm to 3 mm;
there is a distance between said free edge of said hooking part of said second element and said hooking part of said first element that is in the range of 1 mm to 3 mm.

6. Fastening device according to claim 1, wherein the object is a stressed foil and the rigid substrate is a ship deck or window frame.

7. Fastening device, comprising a first element fixed to a rigid substrate and a second element fixed to an object, wherein said second element is releasably fastened to said first element by way of a snapping part of said first element and a snapping part of said second element,
and wherein said first and second elements, remote from their respective snapping parts, each have a hooking part such that, in order to be mutually snap-fixed to each other, said first and second elements at first have to be mutually engaged under a mutual angle by said respective hooking parts and then have to be pivoted onto each other;
wherein said object is a stressed foil and the rigid substrate is a ship deck or a window frame; and wherein:

the hooking part of said first element is limited to a single location and comprises a base and a free edge and from its base to its free edge decreases in width;

the hooking part of said first element has a U or V shape, between the legs of which the hooking part of said second element is configured to be housed;

both of said hooking parts when viewed from above, have an outermost edge that forms an arc of a circle, such that when said first and second elements are fixed to each other the circles that contain said outermost edges of said hooking parts are substantially concentric;

the hooking part of said second element extends completely around said second element;

the hooking part of said second element is part of a hat shaped part of said second element;

the hooking part of said second element extends obliquely upward to its free edge;

the hooking part of said second element merges with an upright wall of said second element at its side facing away from its free edge; such that when said first and second elements are mutually fastened:

the hooking parts of said first and second elements can be mutually, limitlessly turned in the plane of the fastener without said first and second elements becoming disengaged; and said upright wall of said second element extends to above the hooking part of said first element and the free edge of the hooking part of said first element faces said upright wall of said second element with a small gap in between said free edge and said upright wall.

8. Fastening device, comprising a first element fixed to a rigid substrate and a second element fixed to an object, which second element is releasably fastened to the first element by way of a snapping part of the first element and a snapping part of said second element and wherein said first and second elements remote from their respective snapping parts each have a hooking part such that said first and second elements at first had to be mutually engaged under a mutual angle by the respective hooking parts and then were pivoted onto each other to subsequently be mutually snapped fixed to each other, and wherein:

the hooking part of said first element is limited to a single location on said first element and comprises a base and a free edge and from its base to its free edge decreases in width;

the hooking part of said first element has a U shape, between the legs of which the hooking part of said second element is configured to be housed;

both of said hooking parts when viewed from above have an outermost edge that forms an arc of a circle, such that when said first and second elements are fixed to each other the circles that contain said outermost edges of said hooking parts are substantially concentric;

the hooking part of said second element extends completely around said second element;

the hooking part of said second element is part of a hat shaped part of said second element;

the hooking part of said second element extends obliquely upward to its free edge;

the hooking part of said the first element provides a retaining action in the directions upward, downward and away from the snapping parts and no retaining action in the direction towards the snapping parts of said first or second elements;

said snapping part of said first element and said snapping part of said second element are substantially circular when viewed from above; and said circles that contain said outermost edges of said hooking parts and said snapping parts of said first and second elements are concentric;

said snapping part of said second element comprises a resilient part and the snapping part of said first element comprises a narrowing part;

the hooking parts of said first and second elements are present outside the first and second snapping parts;

while the first and second elements are mutually fastened, the hooking parts can be mutually, limitlessly turned substantially in the plane of the fastener without the elements becoming disengaged;

said snapping part of said first element has a part that tightly fits concentrically into a part of snapping part of said second element;

the hooking part of said second element merges with an upright wall of said second element at its side facing away from its free edge;

while the first and second elements are mutually fastened said upright wall extends to above the hooking part of the first element;

the free edge of the hooking part of said first element is present opposite said upright wall, with a small gap of 1 millimeter at the most there between;

while the first and second elements are mutually fastened, the free edge of the hooking part of said second element keeps a distance from the hooking part of said first element of 1 millimeter at the most.

9. Fastening device according to claim 8, wherein the object (10) is a stressed foil and the rigid substrate is a ship deck.

10. Fastening device according to claim 8, wherein the object (10) is a stressed foil and the rigid substrate is a window frame.

\* \* \* \* \*